United States Patent [19]

Harada et al.

[11] Patent Number: 5,013,129
[45] Date of Patent: May 7, 1991

[54] OPTICAL WAVELENGTH CONVERTER DEVICE AND METHOD OF MANUFACTURING SAME

[75] Inventors: Akinori Harada; Yoji Okazaki, both of Kanagawa, Japan

[73] Assignee: Fuji Photo Film Co., Ltd., Kanagawa, Japan

[21] Appl. No.: 503,571

[22] Filed: Apr. 3, 1990

[30] Foreign Application Priority Data

Apr. 7, 1989 [JP] Japan .................................. 1-89482

[51] Int. Cl.⁵ .......................... G02B 6/16; G02F 1/37
[52] U.S. Cl. .................................. 350/96.29; 307/430; 350/96.12; 350/96.34
[58] Field of Search ........................... 307/425–430; 350/96.12, 96.13, 96.14, 96.15, 96.16, 96.29, 96.30, 96.34

[56] References Cited

U.S. PATENT DOCUMENTS

| | | | |
|---|---|---|---|
| 3,660,673 | 5/1972 | Anderson | 307/430 |
| 3,772,528 | 11/1973 | Anderson | 307/430 |
| 4,382,660 | 5/1983 | Pratt, Jr. et al. | 350/96.14 X |
| 4,784,450 | 11/1988 | Jain et al. | 350/96.15 |
| 4,893,888 | 1/1990 | Okazaki et al. | 350/96.12 |
| 4,896,931 | 1/1990 | Khurgin | 350/96.12 |
| 4,896,933 | 1/1990 | Yano et al. | 350/96.15 |
| 4,909,595 | 3/1990 | Okazaki et al. | 350/96.29 |
| 4,909,596 | 3/1990 | Okazaki et al. | 350/96.29 |
| 4,923,277 | 5/1990 | Okazaki et al. | 350/96.29 |

Primary Examiner—John D. Lee
Attorney, Agent, or Firm—Sughrue, Mion, Zinn, Macpeak & Seas

[57] ABSTRACT

An optical wavelength converter device is in the form of a three-dimensional optical waveguide and comprises a cladding and a waveguide element embedded in the cladding and having a refractive index higher than that of the cladding. Each of the cladding and the waveguide element is made of a III - V group, mixed-crystal compound semiconductor material or a II - VI group, mixed-crystal compound semiconductor material. The cladding includes homogeneous portions covering all surfaces of the waveguide element which fully reflect the fundamental wave being guided in the waveguide element.

5 Claims, 1 Drawing Sheet

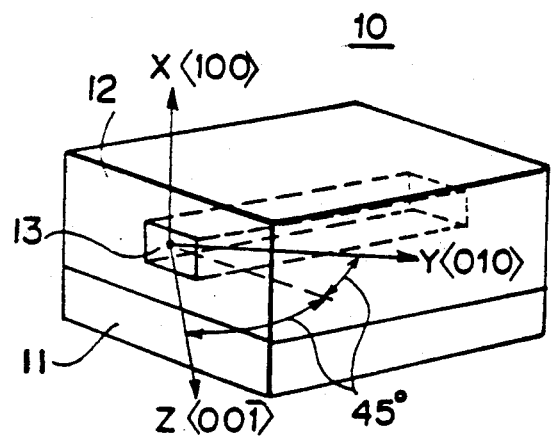
FIG.1
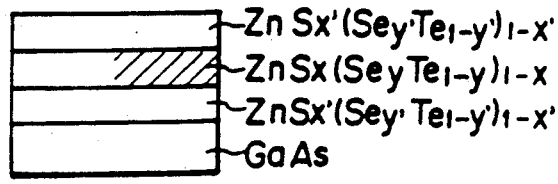
FIG.2(a)
FIG.2(b)
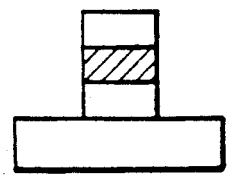
FIG.2(c)
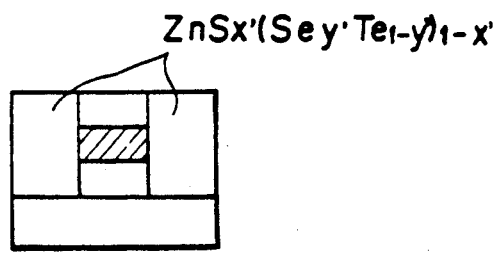
FIG.3
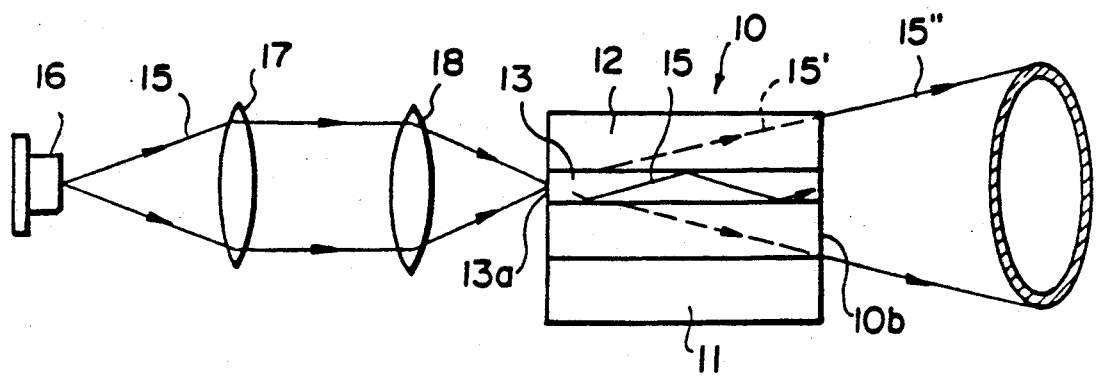

OPTICAL WAVELENGTH CONVERTER DEVICE AND METHOD OF MANUFACTURING SAME

BACKGROUND OF THE INVENTION

1. Field of the Invention

The present invention relates to an optical wavelength converter device, and more particularly, to an optical wavelength converter device in the form of a three-dimensional optical waveguide which is made of a semiconductor material, and a method of manufacturing such an optical wavelength converter device.

2. Description of the Prior Art

Various attempts have heretofore being made to convert the wavelength of a laser beam into a second harmonic (i.e. to shorten the wavelength of a laser beam), using a nonlinear optical material. One well known example of an optical wavelength converter device for effecting such laser wavelength conversion is in the form of a three-dimensional optical waveguide. This optical wavelength converter device comprises a glass substrate serving as a cladding and a waveguide element embedded in the glass substrate. The waveguide element is made of a nonlinear optical material having a refractive index which is higher than the refractive index of the glass substrate. As with a fiber-type optical wavelength converter device, the three-dimensional optical waveguide serving as an optical wavelength converter device can convert the wavelength of a fundamental wave of high intensity into a second harmonic with a high efficiency.

However, since the cladding is made of glass, it is highly difficult to embed the waveguide element fully in the cladding. Therefore, in most optical wavelength converter devices of this type, the waveguide element is embedded in a groove defined in one surface of the glass substrate. According to this waveguide structure, a portion of the waveguide element is not covered with the cladding. Because the wavelength-converted wave which is emitted from the end face of this optical wavelength converter device is a beam having a substantially crescent-shaped cross section, the beam cannot be converged into a sufficiently small beam spot.

SUMMARY OF THE INVENTION

In view of the aforesaid problems of the conventional optical wavelength converter device, it is an object of the present invention to provide an optical wavelength converter device in the form of a three-dimensional optical waveguide, which can easily be manufactured and can produce a wavelength-converted wave that can be converged sufficiently down to the diffraction limit, and a method of manufacturing such an optical wavelength converter device.

According to the present invention, since semiconductor materials of the III - V and II - VI groups exhibit a high nonlinear optical effect, a cladding and a waveguide element are made of these materials. More specifically, an optical wavelength converter device is in the form of a three-dimensional optical waveguide and comprises a cladding having a first refractive index and a waveguide element embedded in the cladding and having a second refractive index higher than the first refractive index, each of the cladding and the waveguide element being made of a III - V group, mixed-crystal compound semiconductor material or a II - VI group, mixed-crystal compound semiconductor material, with the cladding covering all surfaces of the waveguide element which fully reflect the fundamental wave.

The optical wavelength converter device according to the present invention is manufactured as follows: A double-heterostructure is deposited on a substrate, the double-heterostructure having an upper layer, a central layer, and a lower layer, each of the upper, central, and lower layers being made of a III - V group, mixed-crystal compound semiconductor material or a II - VI group, mixed-crystal compound semiconductor material, and the central layer having a refractive index higher than the refractive index of the upper and lower layers. Then, opposite ends of the double-heterostructure are removed, thereby producing a mesa on the substrate. Finally, a homogeneous crystal of a III - V group, mixed-crystal compound semiconductor material or a II - VI group, mixed-crystal compound semiconductor material is grown on the substrate in contact with opposite ends of the mesa, so that the central layer is embedded as a waveguide element in a cladding which is composed of the homogeneous crystal and the upper and lower layers.

The term "homogeneous" used above means a homogeneous condition which may be achieved by making the crystal single material or by freeing it from the nonhomogeneous state which the P and N regions in a semiconductor laser or the like would otherwise have.

The optical wavelength converter device can be manufactured by the conventional semiconductor laser fabrication process (with the step of forming a PN junction being omitted). Therefore, the optical wavelength converter device can easily be manufactured and also can be mass-produced.

Since all surfaces of the waveguide element which fully reflect the fundamental wave being guided in the waveguide element are covered with the homogeneous cladding portions, the wavelength-converted wave which is emitted from the exit end of the optical wavelength converter device has a concentric cross-sectional beam pattern, and hence it can be converged sufficiently down to the diffraction limit.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a schematic perspective view of an optical wavelength converter device according to an embodiment of the present invention;

FIGS. 2(a), 2(b) and 2(c) are views showing a process for manufacturing an optical wavelength converter device according to the present invention; and FIG. 3 is a schematic side elevational view showing how the optical wavelength converter device shown in FIG. 1 works.

DESCRIPTION OF THE PREFERRED EMBODIMENT

FIG. 1 shows an optical wavelength converter device 10 according to the present invention. The optical wavelength converter device 10 is in the form of a three-dimensional optical waveguide which comprises a substrate 11, a cladding 12 mounted on the substrate 11, and a waveguide element or core 13 embedded, except at its opposite ends, in the cladding 13. The waveguide element 13 has a refractive index higher than that of the cladding 13. The substrate 11 is made of GaAs. The cladding 12 is made of a II - VI group, four-way mixed-crystal semiconductor material indicated by $ZnS_{x'}(Se_{y'}Te_{1-y'})_{1-x'}$ (hereinafter referred to as "semiconductor material A") which has lattice matching with the GaAs substrate 11. The waveguide element 13 is made of a II - VI group, four-way mixed-crystal semiconductor material indicated by $ZnS_x(Se_yTe_{1-y})_{1-x}$ (hereinafter referred to as "semiconductor material B") which has lattice matching with the GaAs substrate 11. The parameters (x, y) and (x', y') are selected such that the refractive index of the waveguide element 13 is higher than that of the cladding 12, and the lattice constant of the waveguide element 13 matches that of the GaAs substrate 11.

A process for manufacturing the optical wavelength converter device 10 will be described below with reference to FIGS. 2(a) through 2(c). As shown in FIG. 2(a), a double-heterostructure which comprises a layer of semiconductor material A, a layer of semiconductor material B, and a layer of semiconductor material A is deposited on a substrate of GaAs by metallo-organic chemical vapor deposition (MOCVD), molecular beam epitaxy (MBE), or the like. Then, the left and right ends of the double-heterostructure are etched away by photolithography and etching, producing a mesa as shown in FIG. 2(b). Thereafter, a crystal of semiconductor material A is grown on the GaAs substrate in contact with the left and right ends of the mesa, resulting in an embedded-type three-dimensional optical waveguide in which a waveguide element of semiconductor material B having a rectangular cross section is surrounded at its upper, lower, and lateral sides by a cladding of semiconductor material A, as shown in FIG. 2(c). The crystal of semiconductor material A grown at the left and right ends of the mesa is not required to have a PN junction formed therein, unlike a semiconductor laser. Therefore, the cladding 12 enclosing the waveguide element 13 except at its opposite ends is entirely of homogeneous nature.

According to the present invention, however, the cladding 12 may not necessarily be homogeneous in its entirety, but is at least required to have homogeneous cladding portions which confront the four sides (which will fully reflect an applied fundamental wave when the optical waveguide converter device is in operation) of the waveguide element shown in FIG. 2(c). Insofar as the above requirement is satisfied, cladding portions on the left and right sides of the waveguide element as shown in FIG. 2(c) may be of different materials.

The optical wavelength converter device 10 operates as shown in FIG. 3. A laser beam (fundamental wave) 15, which is emitted as a divergent beam from a semiconductor laser 16 and has a wavelength of 870nm, is converted by a collimator lens 17 into a parallel beam. The parallel laser beam 15 is then converged by an objective lens 18 and applied to the entrance end 13a of the waveguide element 13, as a small beam spot having a diameter which is about the same as the size of the entrance end 13a. The laser beam 15 now enters the optical wavelength converter device 10.

In the illustrated embodiment, as shown in FIG. 1, the waveguide element 13 has an optical axis X perpendicular to the substrate 11, an optical axis Y parallel to the substrate 11 and inclined at 45° with respect to the direction in which the fundamental wave is guided in the waveguide element 13, and an optical axis Z parallel to the substrate 11 and inclined at 135° with respect to the same direction. These optical axes X, Y, Z are indicated by the MIller indices $<100>$, $<010>$, $<00\bar{1}>$, respectively.

The laser beam or fundamental wave 15 is guided in the waveguide 13 while being repeatedly fully reflected by the interface between the waveguide 13 and the cladding 12. While being guided in the waveguide 13, the fundamental wave 15 is converted into a second harmonic 15', whose wavelength is $\frac{1}{2}$ (=435nm) of the wavelength of the fundamental wave 15, by the nonlinear optical effect of the semiconductor material B of the waveguide 13. The second harmonic 15' is radiated into the cladding 12 and travels through the device 10 toward the opposite exit end 10b thereof, while being repeatedly fully reflected by the interface between the outer surface of the cladding 12 and the surrounding medium (which is usually air). Phase matching is achieved between a guided mode, in which the fundamental wave 15 is guided through the core 11, and a radiated mode, in which the second harmonic 15' is radiated into the cladding 12 (Cerenkov radiation).

A light beam 15'', which contains the second harmonic 15', is emitted out of the device 10 from the end 10b thereof. The light beam 15'' then goes through a filter (not shown) which passes only the second harmonic 15. If the cladding 12 is wide and long enough, the second harmonic 15' is not fully reflected as described above, but is emitted directly from the exit end 10b of the device 10.

The fundamental wave 15 is introduced into the optical wavelength converter device 10 such that its polarized direction is perpendicular to the direction in which it is guided and to the optical axis X, i.e. the polarized direction lies intermediate between the optical axes Y, Z. The semiconductor has $\bar{4}3m$ point groups of a cubic system, with the nonlinear optical constant $d_{14}$ being the greatest. With the fundamental wave 15 introduced into the optical wavelength converter device 10 in the above manner, the nonlinear optical constant $d_{14}$ is utilized for high wavelength conversion efficiency.

The polarized direction of the second harmonic 15' is along the optical axis X, i.e. the vertical direction in FIG. 1. As shown in FIG. 3, the second harmonic 15' which is emitted from the optical wavelength converter device 10 has a concentric cross-sectional beam pattern. Therefore, the second harmonic 15' can be converged sufficiently down to the diffraction limit with a general focusing optical system.

The absorption edge of the semiconductor materials A, B of the cladding 12 and the waveguide element 13, respectively, is approximately 410nm. Consequently, the fundamental wave 15 whose wavelength is 870nm is not absorbed by the waveguide element 13 and the second harmonic 15' whose wavelength is 435nm is not absorbed by the cladding 12 either. Therefore, the second harmonic 15' can efficiently be extracted from the device 10.

According to the above embodiment of the present invention, (1) the cladding and the waveguide element are made of II - VI group, mixed-crystal compound semiconductor materials.

However, as modifications, (2) the cladding may be made of a II - VI group, mixed-crystal compound semiconductor material, and the waveguide element may be made of a III - V group, mixed-crystal compound semiconductor material, or (3) the cladding may be made of a III - V group, mixed-crystal compound semiconductor material, and the waveguide element may be made of a II - VI group, mixed-crystal compound semiconductor material, or (4) the cladding and the waveguide element may be made of III - V group, mixed-crystal compound semiconductor materials.

Examples of materials of the optical wavelength converter device, including those referred to in (1) above, other than those specified in the embodiment, are GaAs for the substrate, and $ZnS_x(Se_yTe_{1-y})_{1-x}$ and ZnSe/ZnS strained super-lattice for the waveguide element. Examples of materials of the optical wavelength converter device, including those referred to in (2) above, are GaAs for the substrate, and $ZnS_x(Se_yTe_{1-y})_{1-x}$ and GaAs for the waveguide element.

While the optical wavelength converter device 10 is of the Cerenkov-radiation type, it may be of the waveguide-waveguide type in which phase matching is achieved between the guided mode of the fundamental wave and the guided mode of the wavelength-converted wave in the waveguide element. Since the absorption end of II - VI group, mixed-crystal compound semiconductor materials is present at the shorter-wavelength side of the visible wavelength range, and the absorption end of III - V group, mixed-crystal compound semiconductor materials is present near a wavelength range from 400 to 600 nm, materials should be combined and a phase matching method should be selected in view of these considerations. Material combinations and phase matching methods will be described in detail below with respect to the generation of a wavelength-converted wave in the visible wavelength range.

With the material combination referred to in (1) above, it is possible to construct an optical wavelength converter device of the Cerenkov-radiation type or an optical wavelength converter device of the waveguide-waveguide type.

An optical wavelength converter device of the waveguide-waveguide type should be constructed using the material combination referred to in (2) above only when a wavelenegth-converted wave having a wavelength longer than the absorption end of the III - V group mixed-crystal compound semiconductor material is to be obtained so that the wavelength-converted wave will not be greatly absorbed in the waveguide element. If an optical wavelength converter device of the Cerenkov-radiation type has the material combination (2), then a wavelength-converted wave in the blue wavelength range, for example, which is produced in the waveguide element, will be absorbed to a large extent, but can eventually be extracted out of the device because the evanescent wave of the fundamental wave which seeps into the cladding is wavelength-converted in the cladding.

With the material combination referred to in (3) above, an optical wavelength converter device of the Cerenkov-radiation type should be constructed only when a wavelength-converted wave having a wavelength longer than the absorption end of the III - V group mixed-crystal compound semiconductor material is to be obtained so that the wavelength-converted wave will not be absorbed to a large extent in the cladding.

With the material combination referred to in (4) above, optical wavelength converter devices of the waveguide-waveguide type and the Cerenkov-radiation type should be constructed only when a wavelength-converted wave having a wavelength longer than the absorption end of the III - V group mixed-crystal compound semiconductor material is to be obtained so that the wavelength-converted wave will not be absorbed to a large extent in the waveguide element or the cladding.

The optical wavelength converter device according to the present invention may be arranged not only to convert a fundamental wave into a second harmonic, but also to convert a fundamental wave into a third harmonic or to convert two fundamental waves into a wave having a frequency which is the sum of or difference between the frequencies of the fundamental waves.

Since the optical wavelength converter device according to the present invention can generate a wavelength-converted wave having a concentric cross-sectional beam pattern, as described above, the wavelength-converted wave can be converged sufficiently down to the diffraction limit. If the optical wavelength converter device is used in a recording and reproducing system which employs a high-density recording medium such as an optical disk, then it is possible to employ a wavelength-converted wave in the blue wavelength range as a recording and reproducing light beam. The optical wavelength converter device can easily be mass-produced because it can be manufactured according to the conventional semiconductor laser fabrication process.

Although a certain preferred embodiment has been shown and described, it should be understood that many changes and modifications may be made therein without departing from the scope of the appended claims.

We claim:

1. An optical wavelength converter device comprising a three-dimensional optical waveguide including:
    (i) a cladding having a first refractive index;
    (ii) a waveguide element embedded in said cladding and having a second refractive index higher than said first refractive index, at least one of said cladding and said waveguide element being made of a nonlinear optical material, whereby said waveguide element converts the wavelength of a fundamental wave guided therein;
    (iii) each of said cladding and said waveguide element being made of a III - V group, mixed-crystal compound semiconductor material or a II - VI group, mixed-crystal compound semiconductor material; and
    (iv) said cladding including portions covering all surfaces of said waveguide element which fully reflect the fundamental wave.

2. An optical wavelength converter device according to claim 1, further including:
    a second harmonic wave radiated into said cladding from all surfaces of said waveguide element, wherein all portions of said cladding covering said waveguide element fully reflect said second harmonic wave.

3. An optical wavelength converter device according to claim 1, wherein said cladding is made of said III-V group, mixed-crystal compound semiconductor material and said waveguide element is made of said II-VI group, mixed-crystal compound semiconductor material.

4. An optical wavelength converter device according to claim 1, wherein said cladding is made of said II-VI group, mixed-crystal compound semiconductor material and said waveguide element is made of said III-V group, mixed-crystal compound semiconductor material.

5. A method of manufacturing an optical wavelength converter device in the form of a three-dimensional optical waveguide including a cladding having a first refractive index, and a waveguide element embedded in said cladding and having a second refractive index higher than said first refractive index, at least one of said cladding and said waveguide element being made of a nonlinear optical material, whereby said waveguide element converts the wavelength of a fundamental wave guided therein, said method comprising the steps of:

(i) depositing a double-heterostructure on a substrate, said double-heterostructure having an upper layer, a central layer, and a lower layer, each of said upper, central, and lower layers being made of a III V group, mixed-crystal compound semiconductor material or a II - VI group, mixed-crystal compound semiconductor material, said central layer having a refractive index higher than the refractive index of said upper and lower layers;

(ii) removing opposite ends of said double-heterostructure, thereby producing a mesa on said substrate; and (iii) growing a homogeneous crystal of a III - V group, mixed-crystal compound semiconductor material or a II - VI group, mixed-crystal compound semiconductor material, on said substrate in contact with opposite ends of said mesa, so that said central layer is embedded as a waveguide element in a cladding which is composed of said homogeneous crystal and said upper and lower layers.

* * * * *